(12) United States Patent
Mohan et al.

(10) Patent No.: US 12,442,199 B2
(45) Date of Patent: Oct. 14, 2025

(54) ARCHITECTURAL FLOORING UNDERLAYMENT

(71) Applicants: Zephyros, Inc., Romeo, MI (US); PAK-LITE, INC., Suwanee, GA (US)

(72) Inventors: Varun Mohan, Lexington, SC (US); Christophe Chaut, Molsheim (FR); Kendall Bush, Rochester Hills, MI (US); Greg Thompson, Simpsonville, SC (US); William Desmond Boring, Lawrenceville, GA (US)

(73) Assignees: Zephyros, Inc., Romeo, MI (US); Pak-Lite, Inc., Suwanee, GA (US)

( * ) Notice: Subject to any disclaimer, the term of this patent is extended or adjusted under 35 U.S.C. 154(b) by 401 days.

(21) Appl. No.: 17/792,244

(22) PCT Filed: Jan. 27, 2021

(86) PCT No.: PCT/US2021/015156
§ 371 (c)(1),
(2) Date: Jul. 12, 2022

(87) PCT Pub. No.: WO2021/154768
PCT Pub. Date: Aug. 5, 2021

(65) Prior Publication Data
US 2023/0085014 A1    Mar. 16, 2023

Related U.S. Application Data
(60) Provisional application No. 62/966,243, filed on Jan. 27, 2020.

(51) Int. Cl.
*E04F 15/20* (2006.01)
*B32B 5/02* (2006.01)
(Continued)

(52) U.S. Cl.
CPC .......... *E04F 15/203* (2013.01); *B32B 5/022* (2013.01); *B32B 5/267* (2021.05); *B32B 5/268* (2021.05);
(Continued)

(58) Field of Classification Search
CPC ......... B32B 5/022; B32B 5/267; B32B 5/268; B32B 5/269; B32B 5/26; D06N 7/00;
(Continued)

(56) References Cited

U.S. PATENT DOCUMENTS 5,858,515 A * 1/1999 Stokes ............... A44B 18/0011
156/181
2010/0077684 A1* 4/2010 Socha .................. B32B 5/022
52/403.1
(Continued)

FOREIGN PATENT DOCUMENTS

GB         2407296 A  * 4/2005  .............. B32B 5/26
WO   WO-2016094395 A1 * 6/2016  ............. B32B 13/04
(Continued)

OTHER PUBLICATIONS

International Search Report and Written Opinion dated May 18, 2021, for International Application PCT/US2021/015156.

*Primary Examiner* — Jennifer A Steele
(74) *Attorney, Agent, or Firm* — The Dobrusin Law Firm, P.C.

(57) ABSTRACT

A fibrous structure having one or more vertically lapped layers having a first surface and a second surface and a facing layer secured to the first surface of the vertically lapped layer. The fibrous structure is adapted to be used in a flooring assembly. The fibrous structure may include a mesh and/or a backing layer on the second surface of a vertically lapped layer. The fibrous structure exhibits improved performance in below room testing and/or in-
(Continued)

room testing as compared with traditional materials of the same thickness.

20 Claims, 11 Drawing Sheets

(51) Int. Cl.
| | |
|---|---|
| *B32B 5/26* | (2006.01) |
| *B32B 7/12* | (2006.01) |
| *B32B 9/00* | (2006.01) |
| *B32B 9/02* | (2006.01) |
| *B32B 9/04* | (2006.01) |
| *B32B 21/10* | (2006.01) |
| *D04H 11/04* | (2006.01) |
| *E04F 15/18* | (2006.01) |

(52) U.S. Cl.
CPC ............... *B32B 5/269* (2021.05); *B32B 7/12* (2013.01); *B32B 9/002* (2013.01); *B32B 9/02* (2013.01); *B32B 9/047* (2013.01); *B32B 21/10* (2013.01); *D04H 11/04* (2013.01); *E04F 15/182* (2013.01); *E04F 15/186* (2013.01); *B32B 2262/0253* (2013.01); *B32B 2262/0284* (2013.01); *B32B 2307/102* (2013.01); *B32B 2307/7242* (2013.01); *B32B 2307/732* (2013.01)

(58) Field of Classification Search
CPC ....... E04F 15/203; E04F 15/186; E04F 15/00; D04H 11/04; D04H 3/00
See application file for complete search history.

(56) References Cited

U.S. PATENT DOCUMENTS

| | | | |
|---|---|---|---|
| 2017/0362837 A1* | 12/2017 | Shugg | B32B 27/36 |
| 2018/0223545 A1* | 8/2018 | Stopper | B32B 5/022 |
| 2020/0232133 A1* | 7/2020 | Bush | D04H 1/4218 |
| 2022/0105701 A1* | 4/2022 | Mohan | B32B 5/022 |

FOREIGN PATENT DOCUMENTS

| | | | |
|---|---|---|---|
| WO | 2019/018508 A1 | 1/2019 | |
| WO | WO-2020075111 A1 * | 4/2020 | .......... E04F 15/0215 |

* cited by examiner

ARCHITECTURAL FLOORING UNDERLAYMENT

FIELD

The present teachings relate generally to a composite material and methods of forming the composite material, in particular a composite material for use in flooring applications.

BACKGROUND

Common flooring systems include a subfloor of poured concrete or plywood and a finished floor, generally wood, tile, laminate, vinyl, and the like. Various assemblies are located between the subfloor and the finished floor to reduce sound transmission. Generally, these assemblies include the use of one or more of foams, glass fiber insulation, polymeric mats, liquid adhesives and/or solvents. Such assemblies can be time consuming and labor intensive to install. Some can also lead to undesirable added thickness. For these reasons, and others, industry is constantly seeking alternative flooring systems, or parts thereof, that provide damping and/or reduce audible noise from the floor.

In addition, there remains a need for flooring products that minimize flooring deformation, particularly after extended use. There remains a need for reducing fatigue stress and/or strain inside or beneath sheets, slabs, tiles, or planks. There remains a need for reducing tiles vibrating or noise radiating as a result of the vibration. There also remains a need for a flooring assembly, or parts thereof, that are able to stand up to the pressure of chairs, furniture, or other items that put consistent and/or concentrated pressure on the floor.

SUMMARY

The present teachings meet one or more of the above needs by the improved article and methods described herein. The present teachings provide a fibrous structure or composite material, where the combination of layers and materials thereof yield unique properties, such as improved below-room noise reduction, prevention of flooring cracking, or both, through a fiber-based solution.

The present teachings include a multi-layer fibrous structure. The fibrous structure may include one or more lapped layers and one or more facing layers. The facing layer may be a flooring contact layer adapted to contact a flooring surface. At least one of the lapped layers may be a vertically lapped layer. The facing layer may be secured to a surface of a vertically lapped layer. Fibers of the vertically lapped layer may be oriented generally vertically in an uncompressed state. The vertically lapped layer may be a compressed vertically lapped layer.

The fibrous structure may include a second facing layer acting as a backing layer and/or layer that contacts a subfloor, cement slab, or the like. The fibrous structure may include one or more scrim layers. The fibrous structure may include one or more mesh layers. One or more layers of the fibrous structure may be formed of or may include one or more of a spunbond (S) material, a spunbond and meltblown (SM) material, or a spunbond+meltblown+spunbond (SMS) nonwoven material. For example, a facing layer may include a polypropylene SMS material. A backing layer may include a spunbond PET material.

The fibrous structure may have a thickness of about 5 mm or less, or about 3.5 mm or less. The fibrous structure may, for example, have a thickness of about 1.6 mm or greater and about 5 mm or less. The fibrous structure may, for example, have a thickness of about 1.5 mm or greater and about 3.5 mm or less.

Improved performance (e.g., acoustic performance, durability) may be achieved in below room testing, in-room testing, or both, as compared with traditional materials. The fibrous structure may maintain its loft after a castor chair test at 25,000 cycles at 90 kg.

The present teachings also contemplate a flooring assembly including the fibrous structure and a flooring surface. Exemplary flooring surfaces include vinyl, luxury vinyl tile, laminate, type, wood planks, linoleum, engineered wood, cork, hardwood, bamboo, stone, or a combination thereof. Fibrous flooring surfaces, such as carpet, are also contemplated. The flooring assembly may be adapted to be installed on a subfloor or concrete or cement surface.

DETAILED DESCRIPTION

Figure 1:
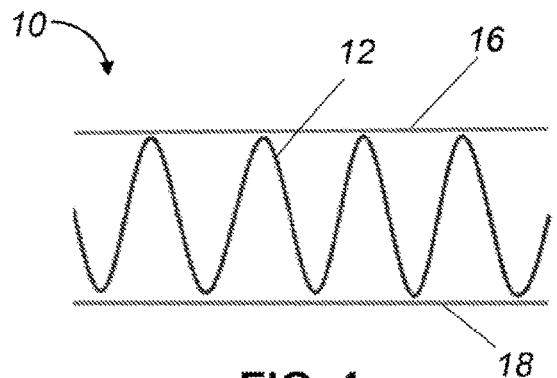
FIG. 1 illustrates an exemplary fibrous structure in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The flooring assemblies and fibrous structures described herein may be located so that the layers provide sufficient acoustic damping and/or isolation. The assemblies may be provided as part of a subfloor, just below a finished floor, onto a concrete subfloor or any combination of these. Subfloor as defined herein may include but not be limited to concrete, cement, wood, or other materials. The fibrous structure may be located below a flooring material. The flooring assemblies and/or fibrous structures may include any number of the layers described herein and each layer may only be included once or may be included in multiple locations throughout the assembly. While referred to herein as layers, it is not necessarily required that each layer be a discrete, separately formed sheet or material. It is possible that different portions of the fibrous structure may have different fibers, materials, properties, densities, weights, or the like within a single sheet. These portions having different fibers, materials, properties, densities, weights, or the like, may be still considered layers of the fibrous structure, even if they are integrally formed. Use of the term layer does not necessarily mean coextensive with an immediately adjacent layer, though it may be coextensive. The assembly may include one or more adhesive layers or adhesive portions. The flooring assembly and/or one or more fibrous structures may include one or more moisture impermeable layers so as to protect the fibrous material layer from moisture that commonly exists on concrete subfloors.

The materials described herein may provide cushioning to a flooring assembly. The materials may function to reduce or prevent damage, such as cracking, to the flooring material. These materials may provide additional benefits such as compression resilience and puncture resistance, protection, padding, odor inhibition, cooling effects, insulative effects, fire retardance (e.g., to meet specific regulations, such as in residential or commercial construction, and/or for heated flooring), water repellency, breathability, or a combination thereof. The material may be shaped to fit the area to which it will be installed or used.

The materials provided herein may reduce audible noises and/or vibrations of elements within the flooring assembly. The flooring assembly as described herein includes a fibrous structure for achieving these benefits. The fibrous structure may include a plurality of layers, thereby forming a layered material. One or more layers may be flexible and/or provide softness. One or more layers may be rigid or provide strength to the fibrous structure.

The layered material may include one or more fibrous layers. While referred to herein for convenience as "layers," it is contemplated that any discussion mentioning layers in the plural may also be referring to a singular layer. For example, it is contemplated that not all fibrous layers, should the fibrous structure include a plurality of fibrous layers, necessarily have the same properties, makeup, or structure. The fibrous layers may provide cushioning or protection. The fibrous layers may provide such cushioning or protection at a light weight. One or more of the fibrous layers may have a high loft (or thickness) at least in part due to the orientation of the fibers (e.g., oriented generally transverse to the longitudinal axis of the layer) of the layer and/or the methods of forming the layer. The fibrous layers may exhibit good resilience and/or compression resistance. Fibrous layers may refer to, for example and not limiting, one or more lofted layers, one or more scrim layers, one or more mesh layers, one or more facing layers, one or more backing layers, the like, or a combination thereof.

The fibrous layers may be adjusted based on the desired properties. The fibrous layers may be tuned to provide a desired weight, thickness, compression resistance, or other physical attributes. The fibrous layers may be formed from nonwoven fibers. The fibrous layers may be a nonwoven structure. The fibrous layers may be thermoformable so that the layers may be molded or otherwise manufactured into a desired shape to meet one or more application requirements. The fibrous layers may be a lofted material. The fibrous layers may be lapped layers (e.g., vertically lapped layers).

The tunable nature of the fibrous layers may be a result of the fibers used therein. The shape, size, type, diameter, modulus, stiffness, denier, crimp level, polymer properties, and the like, may impact performance of the material.

The fibers that make up the fibrous layers (or any other layer of the material) may have an average linear mass density of about 0.5 denier or greater, about 1 denier or greater, or about 5 denier or greater. The material fibers that make up the fibrous layers may have an average linear mass density of about 25 denier or less, about 20 denier or less, or about 15 denier or less. Fibers may be chosen based on considerations such as cost, resiliency, desired moisture absorption/resistance, or the like. For example, a coarser blend of fibers (e.g., a blend of fibers having an average denier of about 12 denier) may help provide resiliency to the fibrous layers. A finer blend (e.g., having a denier of about 10 denier or less or about 5 denier or less) may be used, for example, if a softer material is required. The fibers may have a staple length of about 1.5 millimeters or greater, or even about 70 millimeters or greater (e.g., for carded fibrous webs). For example, the length of the fibers may be between about 30 millimeters and about 65 millimeters. The fibers may have an average or common length of about 50 to 60 millimeters staple length, or any length typical of those used in fiber carding processes. Short fibers may be used (e.g., alone or in combination with other fibers) in any nonwoven processes. For example, some or all of the fibers may be a powder-like consistency (e.g., with a fiber length of about 3 millimeters or less, about 2 millimeters or less, or even smaller, such as about 200 microns or greater or about 500 microns or greater). Fibers of differing lengths may be combined to provide desired properties. The fiber length may vary depending on the application; the moisture properties desired; the type, dimensions and/or properties of the fibrous material (e.g., density, porosity, desired air flow resistance, thickness, size, shape, and the like of the fibrous layer and/or any other layers of the layered material); or any combination thereof. The addition of shorter fibers, alone or in combination with longer fibers, may provide for more effective packing of the fibers, which may allow pore size to be more readily controlled in order to achieve desirable characteristics (e.g., moisture interaction characteristics).

The fibrous layer may include a blend of fibers. The fibrous layer (or any other layer of the material) may include fibers blended with inorganic fibers. The fibrous layer may include natural, manufactured, synthetic fibers, or a combination thereof. Suitable natural fibers may include cotton, jute, wool, flax, silk, cellulose, glass, fibers derived from shells or husks (e.g., fruit and/or nut shells, such as coconut shells or fibers thereon, hazelnut shells, and the like), and ceramic fibers. The fibrous layer may include eco-fibers, such as bamboo fibers or eucalyptus fibers. Suitable manufactured fibers may include those formed from cellulose or protein. Suitable synthetic fibers may include polyester, polypropylene, polyethylene, Nylon, aramid, imide, acrylate fibers, or combination thereof. The fibrous layer material may comprise polyester fibers. The fibers may include polymeric fibers. The fibers may be selected for their melting and/or softening temperatures. The fibers may include mineral or ceramic fibers. The fibers may be or may include elastic or elastomeric fibers. These fibers may provide cushioning performance and/or compressibility and recovery properties. The fibers may provide fire or flame retardance. The fibers may be formed of any material that is capable of being carded and lapped into a three-dimensional structure. The fibers may be up to 100% virgin fibers. The fibers may be regenerated from postconsumer waste (for example, up to about 90% fibers regenerated from postconsumer waste or even up to 100% fibers regenerated from postconsumer waste).

The fibers may have or may provide improved thermal insulation properties. The fibers may have relatively low thermal conductivity. Such fibers may be useful for retaining heat or slowing the rate of heat transfer (e.g., to keep the floor warm). The fibers may have or may provide high thermal conductivity, thereby increasing the rate of heat transfer. Such fibers may be useful for extracting heat from the surface of the floor (e.g., to cool the floor). The fibrous layer may include or contain engineered aerogel structures to impart additional thermal insulating benefits.

At least some of the fibers may be of an inorganic material. The inorganic material may be any material capable of withstanding temperatures of about 250° C. or greater, about 500° C. or greater, about 750° C. or greater, about 1000° C. or greater. The inorganic material may be a material capable of withstanding temperatures up to about 1200° C. (e.g., up to about 1150° C.). The fibers may include a combination of fibers having different melting points. The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. The LOI of the inorganic fibers may be about 23 or greater. The inorganic fibers may have an LOI that is about 25 or greater.

The fibrous layer may include one or more elastomeric fiber materials. The elastomeric fiber materials may act as a binder. The elastomeric fiber materials may provide resilience to the fibrous layer. Exemplary elastomeric fibers include polyester materials, such as a high-performance polyester material.

The fibers may be high-temperature thermoplastic materials.

At least a portion of fibers making up the fibrous layers may have a low melt temperature. The amount of low melt temperature fibers may impact the strength of the layer. For example, improved performance of the fibrous layers and/or fibrous structure as a whole may be achieved by employing a fiber blend having low melt temperature fibers. Such performance may be measured using the Castor Chair Test, where results may be measured using ISO 4918:2016, for example.

The fibers may have a melting point of about 70° C. or greater, about 100° C. or greater, about 110° C. or greater, about 130° C. or greater, 180° C. or greater, about 200° C. or greater, about 225° C. or greater, about 230° C. or greater, or even about 250° C. or greater.

One or more fibrous layers (or any other layer of the material) may include bi-component fibers. The bi-component fibers may be a thermoplastic lower melt bi-component fiber. The bi-component fibers may have a lower melting temperature than the other fibers within the mixture (e.g., a lower melting temperature than common or staple fibers). The bi-component fibers may be air laid or mechanically carded, lapped, and fused in space as a network so that the layered material may have structure and body and can be handled, laminated, fabricated, installed as a cut or molded part, or the like to provide desired properties. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers.

The fibrous layer (or any other layer of the layered material) may include a binder or binder fibers. Binder may be present in the fibrous layer in an amount of about 100 percent by weight or less, about 80 percent by weight or less, about 60 percent by weight or less, about 50 percent by weight or less, about 40 percent by weight or less, about 30 percent by weight or less, about 25 percent by weight or less, or about 15 percent by weight or less. The fibrous layer may be substantially free of binder. The fibrous layer may be entirely free of binder.

While referred to herein as fibers, it is also contemplated that the binder could be generally powder-like, spherical, or any shape capable of being received within interstitial spaces between other fibers and capable of binding the fibrous layer together. The binder may have a softening and/or melting temperature of about 70° C. or greater, about 100° C. or greater, about 110° C. or greater, about 130° C. or greater, 180° C. or greater, about 200° C. or greater, about 225° C. or greater, about 230° C. or greater, or even about 250° C. or greater.

The fibrous layer may include a multi-binder system. The fibrous layer may include one or more sacrificial binder materials and/or binder materials having a lower melting temperature than other fibers within the layer. The fibers may be selected for their melting and/or softening temperatures.

The fibers of the fibrous layer may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in the matrix could be of the low flame and/or smoke emitting type (e.g., for compliance with flame and smoke standards for transportation). Powders or liquids may be incorporated into the matrix that impart additional properties, such as binding, fire/smoke retarding intumescent, expanding polymers that work under heat, induction or radiation, which improves acoustic, physical, thermal, and fire properties.

The fibers and binders discussed herein in the context of the fibrous layers may also be used to form any other layer of the layered material. The fibers and binders discussed herein may be used to form the facing layers, lapped layers, mesh layers, scrim layers, backing layers, or any combination thereof.

The fibrous layers may include one or more lapped layers. A lapped layer may be formed by one or more lapping processes, including cross-lapping, vertical lapping, rotary lapping, the like, or a combination thereof. The lapped layer may have a fiber orientation that is generally vertical (e.g., oriented generally transverse to the longitudinal axis of the layer or forming an angle between about 60 degrees and about 90 degrees relative to the longitudinal axis of the layer). The generally vertical orientation may be prior to compression or while the lapped layer is in an uncompressed state. The fibers may be a unique mixture of vertically or near-vertically oriented fibers. The fibrous layer may be compressed. After compression, the fibers may maintain a generally vertical or near-vertical orientation. After compression, the fiber orientation may be altered. The fibers may be a unique mixture of fibers having a generally Z-shape, C-Shape, or S-shape, or other non-linear shape which may be formed by compressing fibers having a vertical or near-vertically orientation. The fibers may be in a three-dimensional loop structure. The loops may extend through the thickness direction from one surface of the matrix to an opposing surface of the matrix. The fibers may have an orientation within about ±60 degrees from vertical, about ±50 degrees from vertical, or about ±45 degrees from vertical. Vertical may be understood to be relative to a plane extending generally transverse from the longitudinal axis of the composite structure (e.g., in the thickness direction). Therefore, a vertical fiber orientation means that the fibers are generally perpendicular to the length of the composite structure (e.g., fibers extending in the thickness direction). It is also contemplated that fibers may be generally horizontally oriented (e.g., fibers extending in the length and/or width direction).

The lapped layer may have a weight of about 100 grams per square meter (gsm) or greater, about 105 gsm or greater, or about 110 gsm or greater. The lapped layer may have a weight of about 200 gsm or less, about 185 gsm or less, or about 175 gsm or less. In one example, not to serve as limiting, the lapped layer may have a weight of about 115 gsm to about 125 gsm (e.g., about 120 gsm) and formed from up to 100% by weight PET fibers.

The fibers forming the one or more fibrous layers may be formed into a nonwoven web using nonwoven processes including, for example, blending fibers, carding, lapping, air laying, mechanical formation, or a combination thereof. Through these processes, the fibers may be oriented in a generally vertical direction or near-vertical direction (e.g., in a direction generally perpendicular to the longitudinal axis of the fibrous layer). The fibers may be opened and blended using conventional processes. The resulting structure formed may be a lofted fibrous layer. The lofted fibrous layer may be engineered for optimum weight, thickness, physical attributes, thermal conductivity, insulation properties, moisture absorption, or a combination thereof.

One or more fibrous layers may be formed, at least in part, through a carding process. The carding process may separate tufts of material into individual fibers. During the carding process, the fibers may be aligned in substantially parallel orientation with each other and a carding machine may be used to produce the web.

A carded web may undergo a lapping process to produce the fibrous layers. The carded web may be rotary lapped, cross-lapped or vertically lapped, to form a voluminous or lofted nonwoven material. The carded web may be vertically lapped according to processes such as "Struto" or "V-Lap", for example. This construction provides a web with relatively high structural integrity in the direction of the thickness of the fibrous layers, thereby minimizing the probability of the web falling apart during application, or in use, and/or providing compression resistance to the layered material. Carding and lapping processes may create nonwoven fibrous layers that have good compression resistance through the vertical cross-section (e.g., through the thickness of the layered material) and may enable the production of lower mass fibrous layers, especially with lofting to a higher thickness without adding significant amounts of fiber to the matrix. It is contemplated that hollow conjugate fiber may improve lofting capability and resiliency to improve physical integrity. Such an arrangement also provides the ability to achieve a low density web with a relatively low bulk density.

The lapping process may create a pleated or undulated appearance of the fibers when viewed from its cross-section. The frequency of the pleats or undulations may be varied during the lapping process. For example, having an increase in pleats or undulations per area may increase the density and/or stiffness of the layer or layers of the material. Reducing the pleats or undulations per area may increase the flexibility of the layer or layers and/or may decrease the density. The ability to vary the pleat or undulation frequency during the lapping process may allow for properties of the material to be varied or controlled. It is contemplated that the pleat or undulation frequency may be varied throughout the material. During the lapping process, the pleat frequency may be dynamically controlled and/or adjusted. The adjustment may be made during the lapping of a layer of the material. For example, certain portions of the layer may have an increased frequency, while other portions of the layer or layers may have a frequency that is lower. The adjustment may be made during the lapping of different layers of the material. Different layers may be made to have different properties with different pleat frequencies. For example, one layer may have a pleat frequency that is greater than or less than another layer of the layered material.

The fibrous layer or lapped layer may undergo additional processes during its formation. Fibers (e.g., surface fibers) may be mechanically entangled to tie the fibers together. For example, the top surface of the fibrous layer, the bottom surface of the fibrous layer, or both surfaces may undergo the mechanical entanglement. The mechanical entanglement may serve to hold the fibrous layer or lapped layer together, for example, by tying the peaks of the three-dimensional loops together. The mechanical entanglement process may also allow for mechanically tying fabrics or facings to the top and/or bottom surface of the lapped fibrous layer. The surface of the material may instead, or in addition to mechanical entanglement, be melted by an IR heating system, a hot air stream, or a laser beam, for example, to form a skin layer. Fibers, at the surface or within the layer, may be hydroentangled.

The fibrous structure may include one or more additional layers. The fibrous structure may include a plurality of layers, some or all of which serve different functions or provide different properties to the fibrous structure (when compared to other layers of the fibrous structure). The ability to combine layers of materials having different properties may allow the fibrous structure to be customized based on the application. One or more additional layers within the fibrous structure may provide structural properties or may provide physical strength to the fibrous structure. One or more additional layers may repel water, moisture, fluids, and/or particles. A layer may be a permeable membrane to allow breathability while preventing fluid or moisture from seeping down into other layers of the fibrous structure, such as the fibrous layer. One or more layers may provide to encapsulate the system. One or more layers may have a damping effect. One or more layers may have air flow resistive properties. The layer may provide compression resistance, resilience, or both. The layer, or the fibrous structure as a whole, may provide insulative properties. The layer, or the fibrous structure as a whole, may be tuned to provide a desired thermal resistance. The layer, or the fibrous structure as a whole, may be tuned to provide a desired thermal conductivity. The layer, or the fibrous structure as a whole, may be tuned to provide desired properties, such as flame or fire retardance, smoke retardance, reduced toxicity, or the like. The layer may be able to withstand exposure to elevated temperatures.

These layers may include one or more of a facing layer, a backing layer, one or more intermediate layers, mesh layers, scrim layers, skin layers, or the like. A layer may be a flooring contact layer. A facing layer, backing layer, mesh, scrim or a combination thereof may be applied to the fibrous or lapped layer. An additional functional layer may be applied to the fibrous structure or lapped layer. Another lapped layer or structure may be secured to a lapped layer. Another intermediate layer formed from any of the materials or structures described herein may be positioned between two lapped structures. Any combination of layers is contemplated herein.

As an example, the fibrous structure may include a facing layer and a backing layer sandwiching a layer having fibers that are generally vertically oriented in an uncompressed state. One or more of the facing and/or backing layers may be an air flow resistive (AFR) layer. As an example, the fibrous structure may include a facing layer, a lapped layer, a mesh layer, and a backing layer. The layers may be arranged in that order. One or more adhesives or adhesive layers may be located between certain layers. For example, a glue or adhesive layer may be located between the facing layer and the lapped layer. The glue or adhesive layer may be applied to the facing layer or be part of the facing layer prior to securing the facing layer to the lapped layer. A glue or adhesive layer may be located between the backing layer and the lapped layer. The glue or adhesive layer may be part of or applied to the backing layer prior to securing the backing layer to the lapped layer. A mesh layer may be sandwiched between the lapped layer and the backing layer. The mesh layer may be sufficiently open such that the adhesive or glue bonds the backing layer and the lapped layer.

The one or more additional layers may be formed of different materials. The one or more additional layers may be formed of the same materials. One or more additional layers may be formed from the fibers and/or binders as discussed herein with respect to the fibrous layer. The fibrous structure may include needlepunched layers, one or more spunbond layers, one or more melt-blown layers, one or more spun-laced layers, one or more air-laid layers, or a combination thereof. A layer may be formed of spunbond (S) material, a spunbond and meltblown (SM) material, or a spunbond+meltblown+spunbond (SMS) nonwoven material. For example, a facing layer may be an SMS material. The facing layer may be a polypropylene SMS material. A backing layer may, for example, be a spunbond layer. The backing may be a PET spunbond layer. A layer may be spunlaced and/or hydroentangled.

The one or more additional layers may include a scrim and/or a mesh. A layer may be a scrim. A layer may be a needlepunched layer, such as a needlepunched scrim. A layer may be a mesh layer. A layer may be a reinforcing mesh. A layer may be a generally open mesh. A layer may be a mesh scrim (e.g., glass, metal, polymeric, such as PET or polyethylene (e.g., high-density polyethylene (HDPE)), the like, or a combination thereof). A mesh layer may, for example, be a HDPE mesh. A mesh scrim may be embedded within one or more other layers of the fibrous structure. A mesh layer may have sufficient openness that adhesive may join two layers sandwiching the mesh layer. For example, the mesh may be sufficiently open such that an adhesive on a backing layer may act to secure the backing layer and the mesh layer to a lapped layer. A mesh layer may have sufficient openness such that other methods of attachment are possible between two layers sandwiching the mesh layer (e.g., allowing for a reaction to occur between materials of one layer and another layer, heating one or more layers such that upon softening or melting of one or more components, the softened or melted material is capable of flowing through the mesh to another layer). A mesh layer may have a weight of about 15 gsm or greater, about 20 gsm or greater, or about 22 gsm or greater. A mesh layer may have a weight of about 35 gsm or less, about 30 gsm or less, or about 28 gsm or less.

A layer of the fibrous structure may be a non-air flow resistive layer (e.g., a non-air flow resistive scrim). A layer may be a woven material, a nonwoven material, or both. A layer may be a felt material. A layer may be formed of a material that hardens or expands (e.g., upon activation) to provide stiffness or additional structural properties to the fibrous structure. The layer may be polymeric, where crystallinity can be adjusted to alter the structural properties of the fibrous structure. The crystallinity may be tuned, for example, during any heating and/or cooling process of the fibrous structure formation process. A layer may be formed of a polymeric, copolymeric, elastic, elastomeric, rubber, thermoplastic, thermosettable, or the like, material. A layer may be a laminate. The materials, or one or more layers formed from the materials, may provide cushioning and/or resilience to the fibrous structure. A layer may include or may be formed from a powder.

A layer of the fibrous structure may have high infrared reflectance or low emissivity. At least a portion of layer may be metalized to provide infrared (IR) radiant heat reflection. The layer may be perforated. The layer may be permeable. The layer may be selectively permeable by design. The layer may be inherently permeable. To provide heat reflective properties to and/or protect other layers of the structure, the layer (e.g., fibers thereof, a surface of the layer, or the layer itself) may be metalized.

Where one or more layers of the fibrous structure may be exposed to high temperatures, a layer may include solid films, perforated films, solid foils, perforated foils, woven or nonwoven scrims, selectively permeable films or foils, or other materials. Any of the layers may have a thermal resistance capable of withstanding the temperatures to which the layers will be exposed. These materials, however, are not limited to use in high temperature applications. It is contemplated that such materials may also be used for facing layers of the fibrous structure, for example.

A layer may be capable of providing other benefits, such as odor control and/or antimicrobial properties. For example, the layer may be an active carbon film or other nonwoven layer. The layer may include or be treated with copper, steel (e.g., stainless steel), silver, or other metallic materials. Other layers of the fibrous structure (e.g., carded layers) may include these components for achieving odor control and/or antimicrobial properties.

One or more additional layers may be generally hydrophobic. One or more additional layers may be generally hydrophilic. A corrosion resistant coating may be applied to reduce or protect metal (e.g., aluminum) from oxidizing and/or losing reflectivity. IR reflective coatings not based on metallization technology may be added. One or more coatings may be applied to the fibers forming the additional layer, or to the surface of the layer itself. Oleophobic and/or hydrophobic treatments may be added. Flame retardants may be added. One or more additional layers may be porous or perforated. One or more layers may be permeable or at least partially permeable. One or more additional layers may be solid (e.g., non-porous or non-perforated). One or more additional layers may be generally flexible. One or more additional layers may be generally rigid.

As an example, the fibrous structure may include one or more facing layers. The facing layer may be an outermost layer of the fibrous structure. The facing layer may be adapted to be in planar contact with the underside of a flooring layer. Therefore, the facing layer may act as a flooring contact layer. The facing layer may have air flow resistive properties. The facing layer may be formed of a polymeric material. The facing layer may be formed of or may include, for example, a polypropylene or polyester material. The facing layer may be formed of spunbond (S) material, a spunbond and meltblown (SM) material, or a spunbond+meltblown+spunbond (SMS) nonwoven material. For example, the facing layer acting as a flooring contact layer may be a polypropylene SMS layer.

One or more facing layers of the fibrous structure may have a weight of about 45 gsm or greater, about 48 gam or greater, or about 50 gsm or greater. One or more facing layers of the fibrous structure may have a weight of about 65 gsm or less, about 62 gsm or less, or about 60 gsm or less.

One or more facing layers may bond to an adjacent layer (e.g., a lapped layer) via an adhesive material. The adhesive material may be applied to the facing layer. The adhesive material may be integrally formed with the facing layer. The adhesive properties may be a result of one or more components forming the facing layer (e.g., wherein one or more components soften and/or melt upon application of heat to bond to an adjacent layer, or wherein one or more components of one layer reacts with one or more components of an adjacent layer, creating a bond upon contact). The adhesive material may be located on the facing layer prior to positioning the facing layer on the adjacent layer (e.g., a lapped layer). For example, the adhesive material may be an ethylene vinyl acetate (EVA) adhesive, though other adhesives are also contemplated.

The adhesive material between a facing layer and an adjacent layer may have a weight of about 4 gsm or greater, about 5 gam or greater, or about 6 gsm or greater. The adhesive material may have a weight of about 16 gsm or less, about 15 gsm or less, or about 14 gsm or less.

The fibrous structure may include a backing layer. While referred to herein as a backing layer, it may be considered another facing layer. It is also contemplated that the fibrous structure may be flipped such that a facing layer (e.g., a layer facing the flooring material) becomes the backing layer (e.g., a layer facing the subfloor) and the backing layer becomes the facing layer. The backing layer may be formed of a polypropylene or polyester material. The backing layer may be formed of spunbond (S) material, a spunbond and meltblown (SM) material, or a spunbond+meltblown+spunbond (SMS) nonwoven material. For example, the backing layer may be a PET spunbond layer. The backing layer may be the undermost layer of the fibrous structure. The backing layer may be adapted to be in planar contact with the subfloor to which the fibrous structure is to be positioned. It is also contemplated that the fibrous structure is free of a backing layer. The backing layer may be a scrim.

A backing layer may have a weight of about 8 gsm or greater, about 9 gsm or greater, or about 10 gsm or greater. A backing layer may have a weight of about 22 gsm or less, about 21 gsm or less, or about 20 gsm or less.

One or more backing layers may bond to one or more adjacent layers via an adhesive material. The adhesive material may be applied to a backing layer. The adhesive material may be integrally formed with the backing layer. The adhesive properties may be a result of one or more components forming the backing layer (e.g., wherein one or more components soften and/or melt upon application of heat to bond to an adjacent layer, or wherein one or more components of one layer reacts with one or more components of an adjacent layer, creating a bond upon contact).

The adhesive material may be located on the backing layer prior to positioning the backing layer on an adjacent layer (e.g., a lapped layer and/or a mesh layer). For example, the adhesive material may be an ethylene vinyl acetate (EVA) adhesive, though other adhesives are also contemplated. In examples where a mesh layer is sandwiched between the backing layer and a lapped layer, the adhesive material may act to encapsulate the mesh layer within the fibrous structure. The adhesive material may flow through the openings in the mesh layer to join the backing layer to the layer on the opposing side of the mesh layer (e.g., a lapped layer).

The adhesive material between a backing layer and an adjacent layer may have a weight of about 1 gsm or greater, about 2 gsm or greater, or about 4 gsm or greater. The adhesive material may have a weight of about 10 gsm or less, about 8 gsm or less, or about 6 gsm or less.

One or more facing layers (including backing layers) may have a thickness of about 1 mm or less, about 0.5 mm or less, or about 0.2 mm or less.

One or more intermediate layers may be located between a facing layer or flooring contact layer and the fibrous layer. An intermediate layer may be any of the possible layers described herein.

An adhesive may be located on or between any layers of the fibrous structure. The adhesive may allow for adhering the fibrous structure to a desired substrate (e.g., a flooring surface, a subfloor or cement floor, or both). The fibrous structure may be provided with a pressure sensitive adhesive (PSA). The PSA may be applied from a roll and laminated to a surface of the fibrous structure. A release liner may carry the PSA. Prior to installation of the fibrous structure, the release liner may be removed from the pressure sensitive adhesive to allow the fibrous structure to be adhered to a substrate or surface. For some applications, it may be beneficial to provide a release liner with a high tear strength that is easy to remove.

While any configuration of layers is possible, an exemplary configuration includes a lapped layer having a facing layer on one surface and a backing layer. A mesh scrim, such as a glass or PET mesh scrim, may be positioned on or within the fibrous layer. The mesh scrim may be laid on or below the lapped layer. After heating and/or lamination, the mesh may be embedded within the fibrous structure. Such mesh could provide increased stability, compression resistance, strength, stiffness, product lifetime, the like, or a combination thereof.

A non-limiting configuration may include a facing layer, a lapped layer, a mesh layer, and a backing layer, in that order. Adhesive may be disposed between the facing layer and the lapped layer. Adhesive may be disposed between the backing layer and the lapped layer. The adhesive may be permitted to flow through the openings in the mesh layer to secure the backing layer to the lapped layer.

The fibrous structure layers may be bonded together to create the finished fibrous structure. One or more layers may be bonded together by elements present in the layers. For example, the binder fibers in the layers may serve to bond the layers together. The outer layers (i.e., the sheath) of bi-component fibers in one or more layers may soften and/or melt upon the application of heat, which may cause the fibers of the individual layers to adhere to each other and/or to adhere to the fibers of other layers. The fibrous structure, or parts thereof, may be formed or assembled using a lamination process. For example, the fibrous structure may be constructed by carding and lapping one or more thicker nonwoven layers and applying heat via lamination. Lamination may be performed to compress one or more layers (e.g., one or more lapped layers). Layers may be joined through one or more lamination processes. The layers may be laminated to another layer within the nonwoven production and laminating process, or as separate processes. Additional layers can be laminated in the same way. One or more adhesives may be used to join two or more layers. The adhesives may be a powder or may be applied in strips, sheets, or as a liquid, for example. It is possible that the adhesive does not block the air flow through the material (e.g., does not plug openings, perforations, pores, or the like).

The finished fibrous structure may have a thickness of about 10 mm or less, about 7 mm or less, or about 5 mm or less. The fibrous structure may have a thickness of about 1 mm or more, about 1.25 mm or more, or about 1.5 mm or more. For example, the finished structure may have a thickness of about 1.5 mm or greater and about 5 mm or less. The finished structure may have a thickness of about 1.5 mm or greater and about 3.5 mm or less.

Acoustic properties of the fibrous structure (and/or its layers) may be impacted by the shape of the fibrous structure. The fibrous structure, or one or more of its layers, may be generally flat. The finished fibrous composite may be fabricated into cut-to-print two-dimensional flat parts for installation into the end user, installer, or customer's assembly. The fibrous structure may be formed into any shape. For example, the fibrous structure may be molded (e.g., into a three-dimensional shape) to generally match the shape of the area to which it will be installed. The finished fibrous composite may be molded-to-print into a three-dimensional shape for installation into the end user, installer, or customer's assembly. The three-dimensional geometry of a molded product may provide additional acoustic absorption. The three-dimensional shape may provide structural rigidity and an air space.

The present teachings also include a flooring assembly. The flooring assembly may include a fibrous structure and one or more flooring surfaces. Exemplary flooring surfaces include vinyl, luxury vinyl tile, laminate, tile, wood planks, linoleum, engineered wood, cork, hardwood, bamboo, and stone. Fibrous flooring surfaces, such as carpet, are also contemplated. The flooring assembly may therefore include a fibrous structure positioned on a subfloor or cement slab. The flooring surface may then be positioned on the fibrous structure. The fibrous structure as described herein acts to decouple the flooring from a concrete or cement slab or wooden subfloor to provide superior noise reduction.

The fibrous structure may be used to provide improved in-room acoustic performance. In-room acoustic performance refers to the acoustic absorption and/or damping in the room where the fibrous structure is located. One or more layers, such as the facing layer, may create micro-pockets or air gaps between the facing and the flooring, which may help improve performance. The facing layer in combination with a lapped layer (e.g., a compressed vertically lapped layer) may create improved performance in the room.

The fibrous structure may be used to provide improved below-room acoustic performance. This may be desirable, for example, in multi-level structures (e.g., multi-floor buildings) to reduce audible noise between floors. The fibrous structure may, for example, reduce the audible noise of or prevent someone from hearing the footfall of a person on the floor above. The lapped fiber layer alone or in conjunction with other layers of the material may act to provide a spring effect between the flooring layer and the concrete or subfloor below. In testing below room performance, the lower the spring stiffness of the material, the lower the noise inside the receiving chamber.

The fibrous structure may provide improved acoustic performance at a lower thickness. Equivalent or similar acoustic performance may be achieved by thicker products, such as those about 5 mm or greater (or greater than 5 mm). However, materials of this thickness generally affect flooring durability. The present teachings achieve the desired acoustic performance at a lower thickness than traditional materials.

The fibrous structure may provide superior acoustic performance compared to other traditional materials. The fibrous structure may provide increased durability compared to other traditional materials when using the castor chair test. The fibrous structure may maintain its loft after conducting durability testing. Maintaining proper structure may also thereby maintain acoustic performance when other traditional materials, like foams, would be crushed during the castor chair test with 25 k cycles at 90 kg.

Turning now to the figures, FIG. 1 is an exemplary fibrous structure 10. As shown, the fibrous structure 10 includes a lapped layer 12. A facing layer 16 is located on one side of the lapped layer 12. The facing layer may serve as a flooring contact layer, thereby making contact with a flooring surface when installed. A backing layer 18 is located on the opposing side of the lapped layer 12. The backing layer 18 may be adapted to contact a subfloor or cement when installed. It is contemplated that the backing layer may be omitted.

Figure 2:
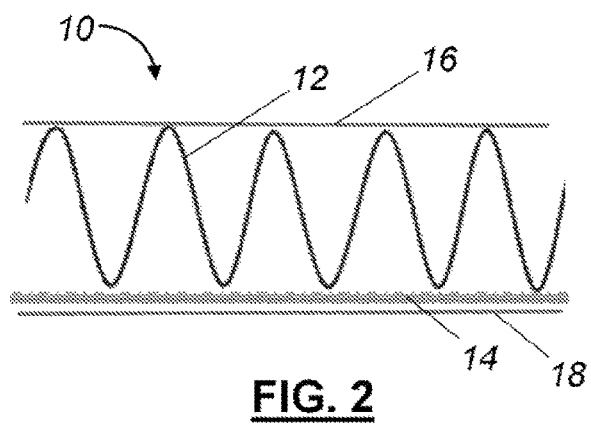
FIG. 2 illustrates an exemplary fibrous structure in accordance with the present teachings.

FIG. 2 is an exemplary fibrous structure 10. As shown, the fibrous structure 10 includes a lapped layer 12. A facing layer 16 is located on one side of the lapped layer 12. A mesh layer 14 is located on the opposing side of the lapped layer 12. A backing layer 18 is located on the opposing side of the lapped layer 12. The backing layer 18 may be adapted to contact a subfloor or cement when installed.

Figure 3:
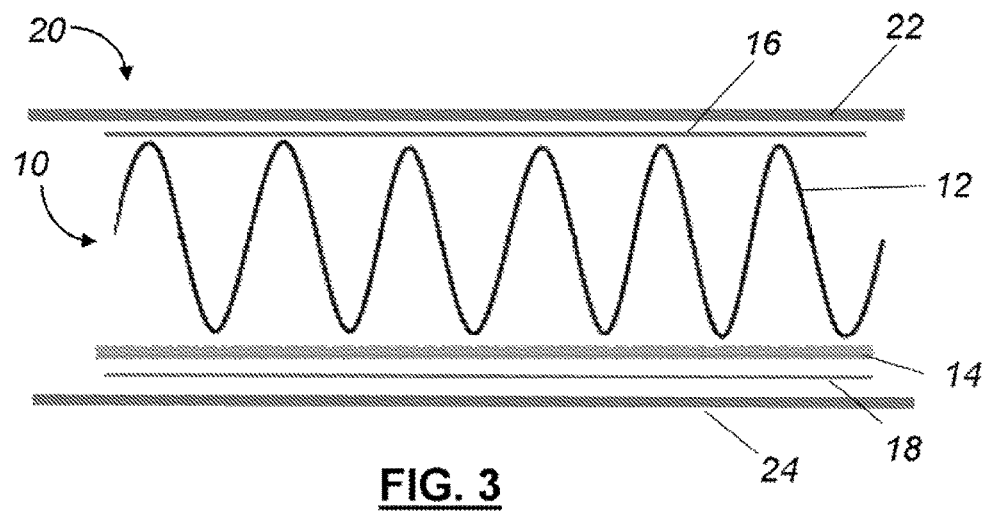
FIG. 3 illustrates an exemplary flooring assembly including an exemplary fibrous structure in accordance with the present teachings.

FIG. 3 is an exemplary fibrous structure 10 as part of a flooring assembly 20. The fibrous structure 10 includes a lapped layer 12, which supports a facing layer 16. An optional backing layer 18 is located on the opposing side. A mesh layer 14 is located between the backing layer 18 and the lapped layer 12. The facing layer 16 as shown herein makes planar contact with the underside of a flooring surface 22. The backing layer 18 rests upon a subfloor 24 of the flooring assembly 20. The gap shown between each layer in the figure is for clarity. It is contemplated that any or all of the layers are in direct planar contact with the layer directly adjacent.

The facing layer and the backing layer may be formed of the same materials or different. The facing layer, backing layer, or both may be formed from the same materials as fibers in the lapped layer. One or more of the facing layer, backing layer, and lapped layer may include polyester material. The facing layer and/or backing layer may include a polypropylene material, polyester (e.g., PET) material, or a combination thereof. The facing layer and/or backing layer may include a spunbond, spunbond meltblown, or spunbond meltblown spunbond (SMS) material. The facing layer may, for example, include a polypropylene SMS material. The backing layer may be formed of a polyester, such as PET. For example, the backing layer may include a spunbond PET material.

ILLUSTRATIVE EXAMPLES

Figure 4:
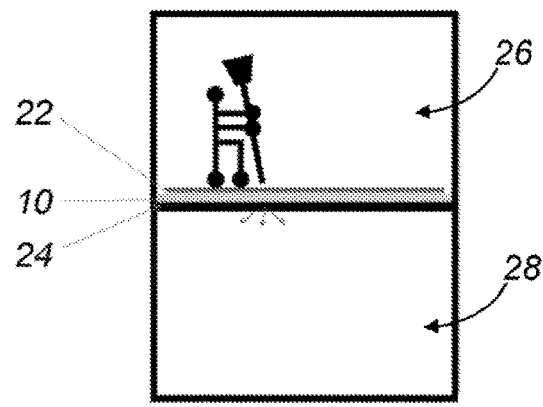
FIG. 4 illustrates the testing locations for a flooring assembly.

Tests are conducted for comparing performance of various materials in-room and below-room. FIG. 4 illustrates the testing areas. A fibrous structure 10 is located between a flooring surface 22 and a subfloor 24. The testing conducted is measuring performance in room 26 and below room 28. Impact Insulation Class (DC) ASTM E1007 testing is performed for testing sound traveling through the total floor/ceiling assembly (e.g., from an upper living area to a lower living area), DC testing is for impact noise, like footfalls, moving furniture, tines dropping on the floor, and the like. In-room testing is performed in accordance with ISO523B. The testing is conducted using a 6-inch concrete slab subfloor and using a 5.5 luxury vinyl tile (LVT)/wood plastic composite (WPC) type flooring.

Figure 5A:
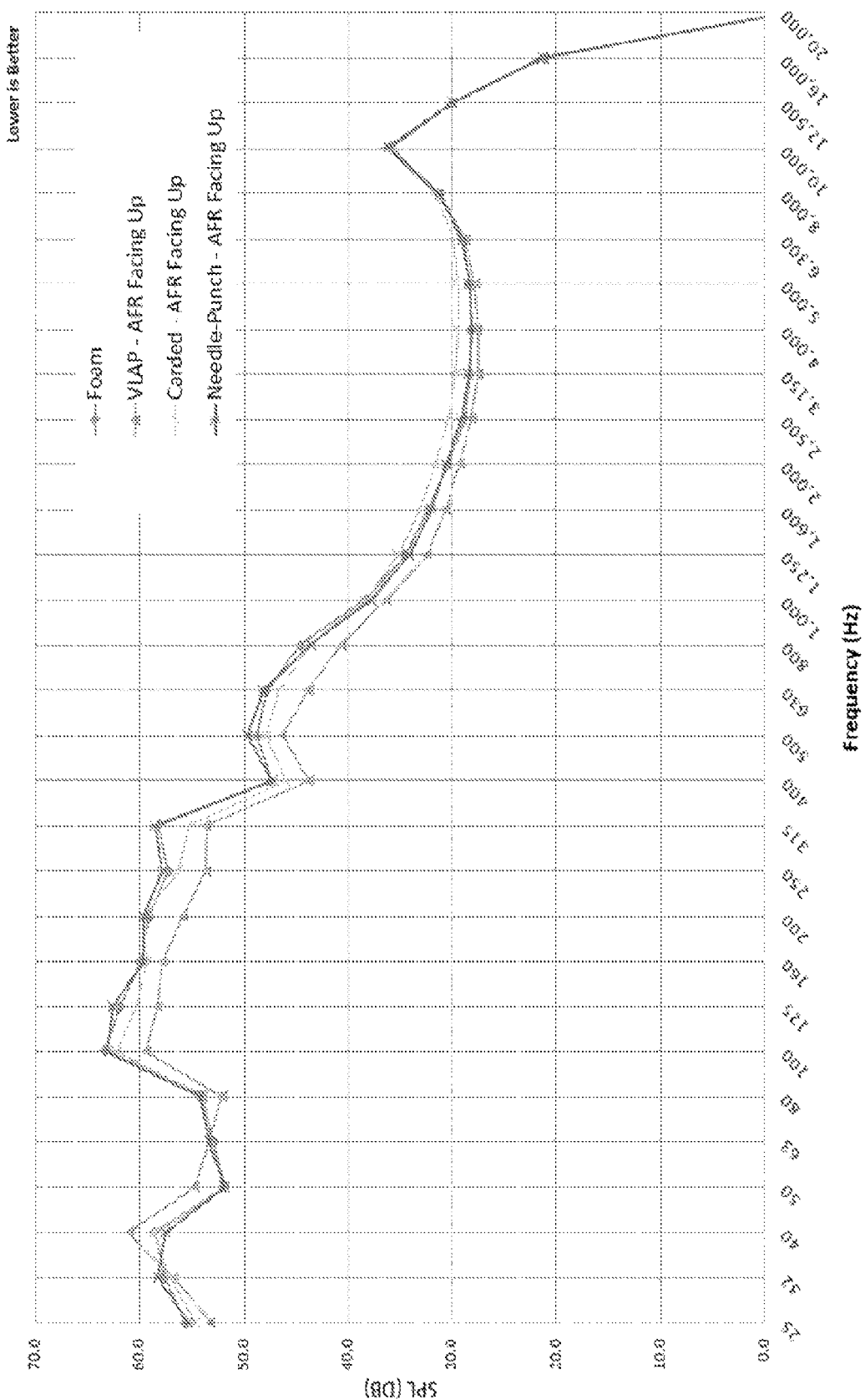
FIGS. 5A and 5B show performance data for various materials in below room testing and in room testing.
Figure 5B:
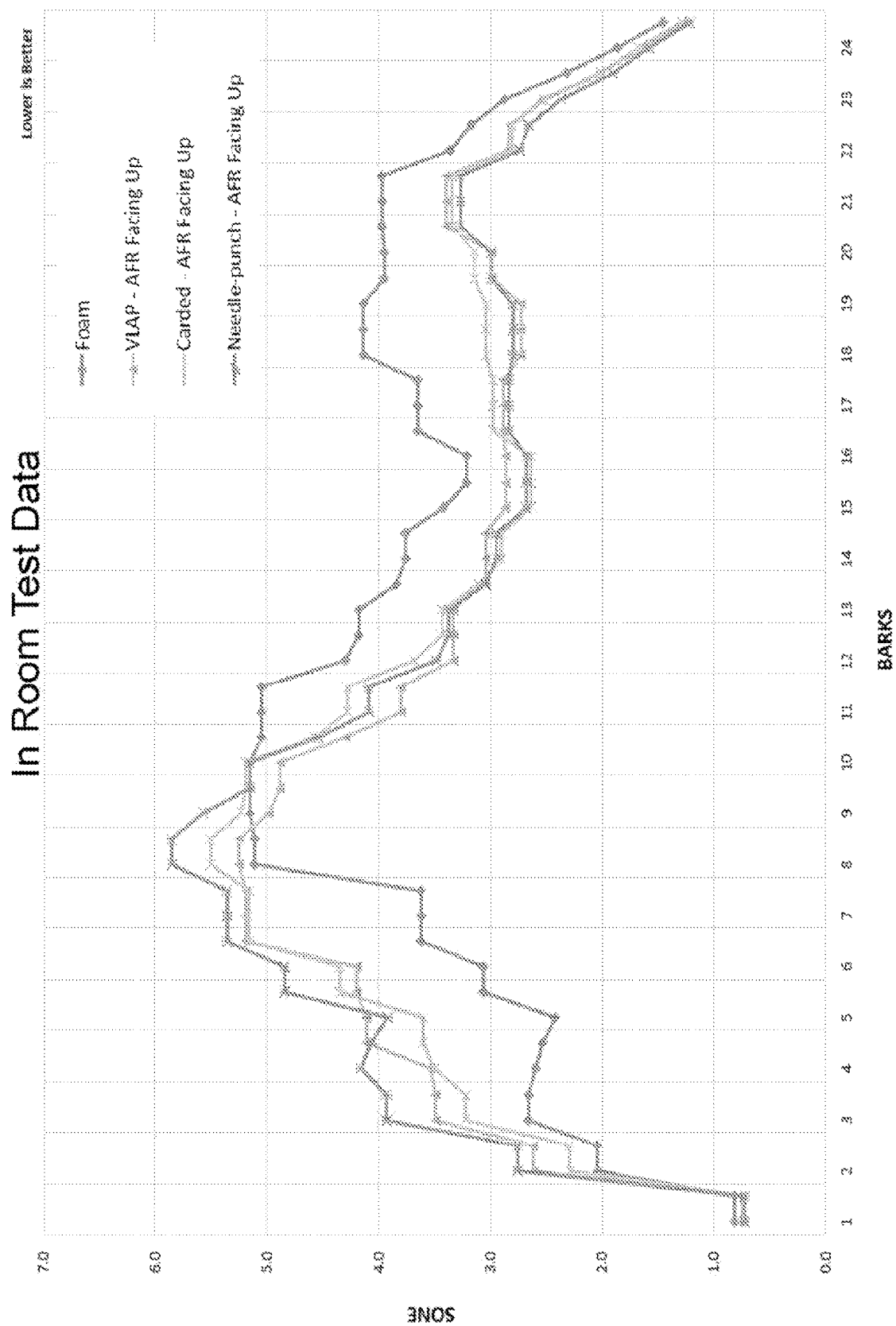

FIGS. 5A and 5B show comparison data between vertically lapped material in accordance with the present teachings (data points: triangles), a carded and cross-lapped material (data points: x), a needle punched material (data points: *), and a foam material (data points: diamonds). The materials all have the same facing layer facing upward (i.e., toward the flooring layer). FIG. 5A shows results from testing below room, and FIG. 5B shows results from testing in-room. All materials tested are held at the same thickness and gsm with the exception of the needle punched material, which is 1 mm less. Each material has the same fiber blend, facing, and lamination technique. The results show that the vertically lapped material in accordance with the present teachings is 2 IIC better than the carded/cross-lapped material and 4 IIC better than the foam material.

Figure 6A:
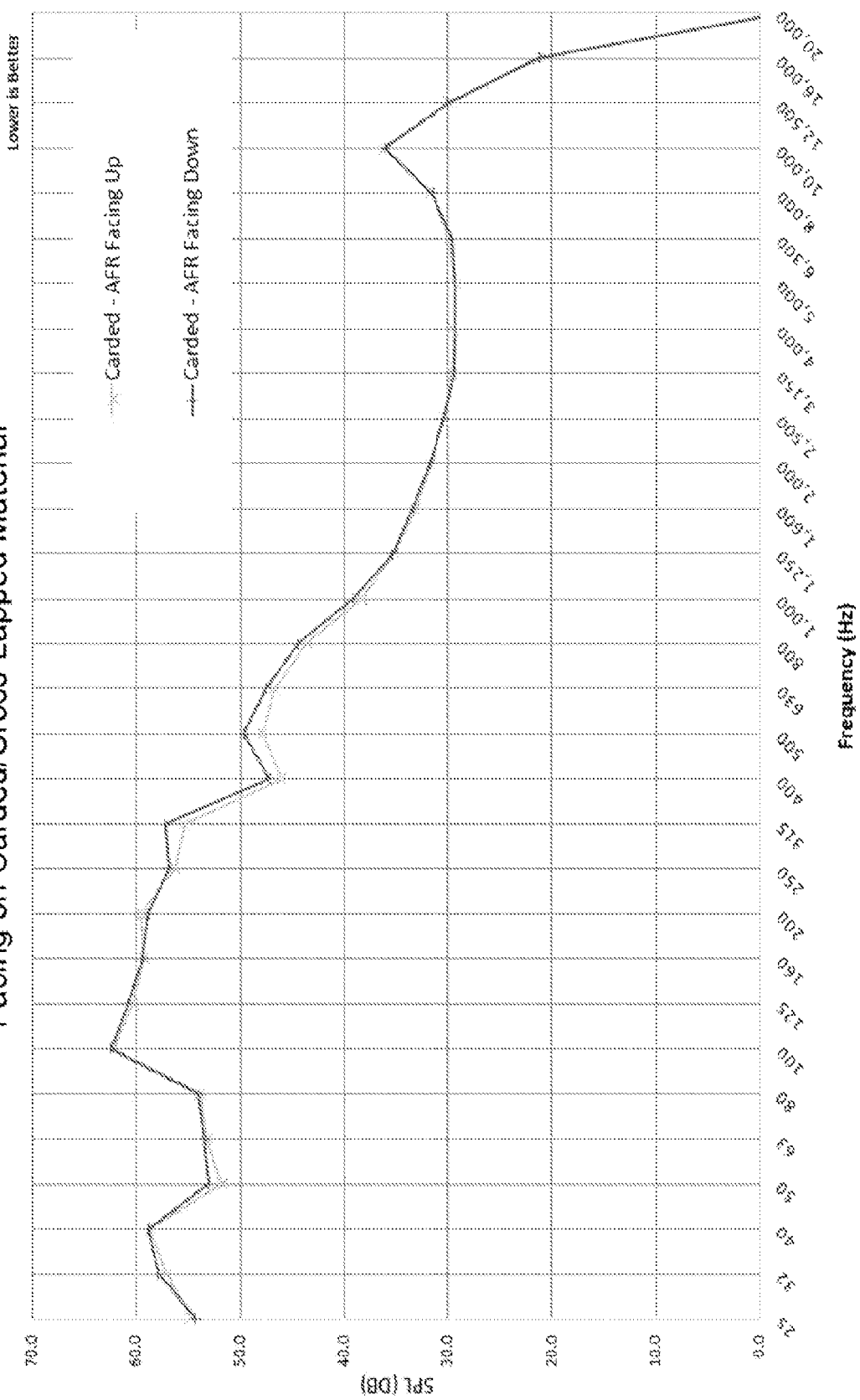
FIGS. 6A and 6B show performance data in below room testing and in room testing for the effect of an AFR facing on a carded/cross-lapped material.
Figure 6B:
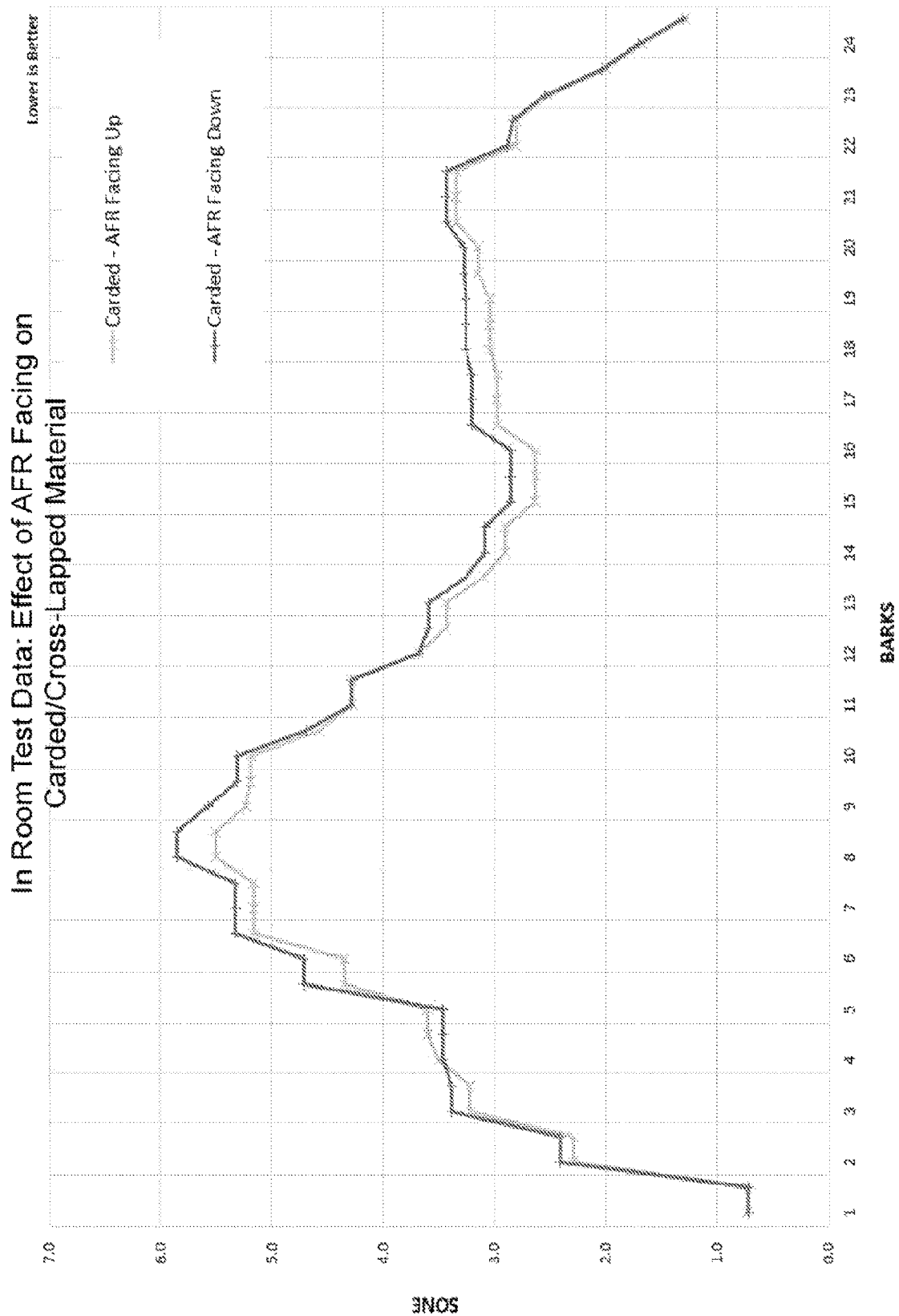

FIGS. 6A and 6B show comparison data between a carded/cross-lapped layer having a facing layer facing upwards (i.e., toward the flooring layer), where the data points are denoted by an x, and a carded/cross-lapped layer having the facing layer facing downward (i.e., toward the subfloor or cement), where the data points are denoted by a +. FIG. 6A shows results from testing below room, and FIG. 6B shows results from testing in-room. The results show the presence of a facing layer between the carded/cross-lapped material and the flooring layer provides an improvement in in-room performance, where the facing layer is an AFR facing.

Figure 7A:
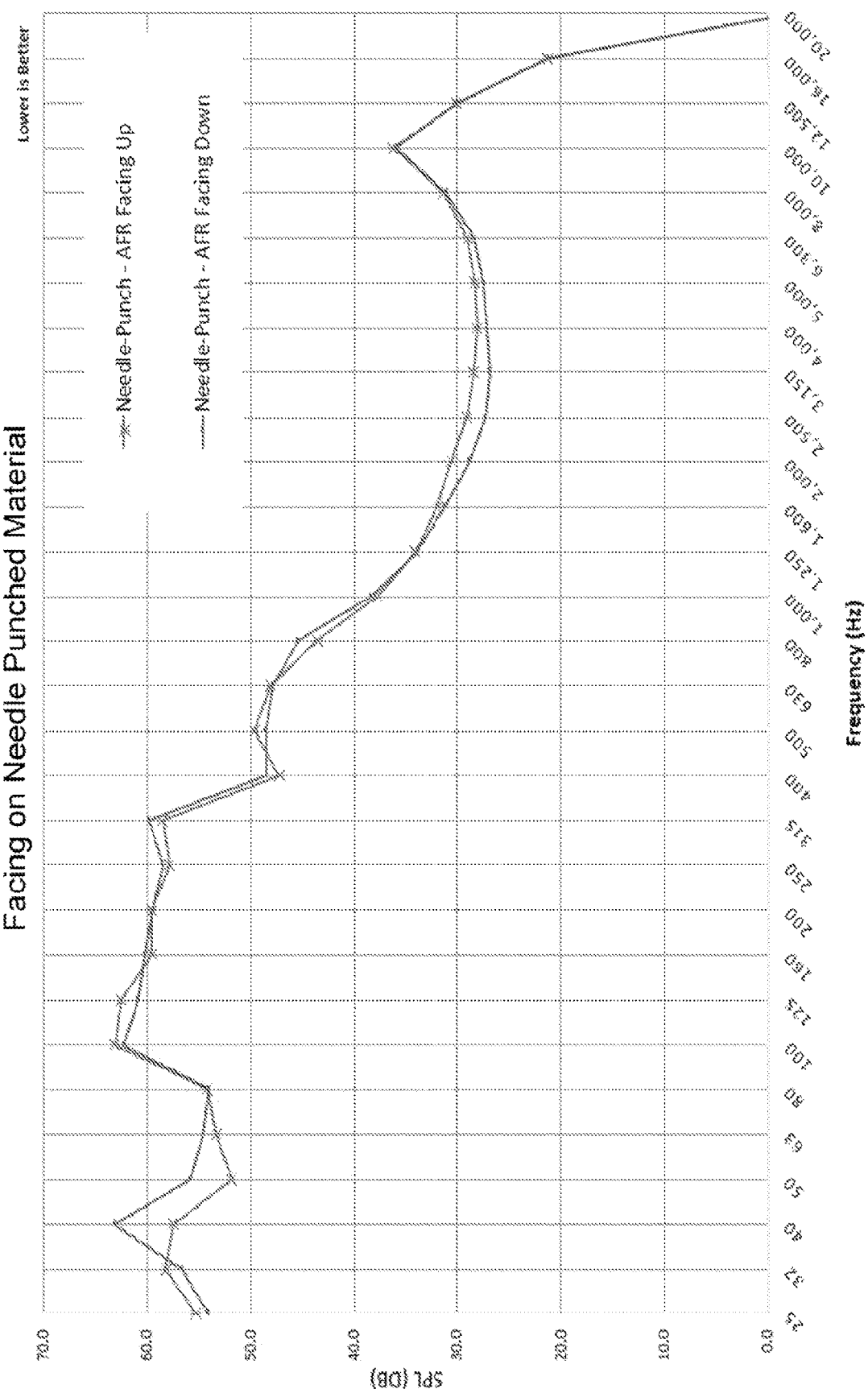
FIGS. 7A and 7B show performance data in below room testing and in room testing for the effect of an AFR facing on needle punched material.
Figure 7B:
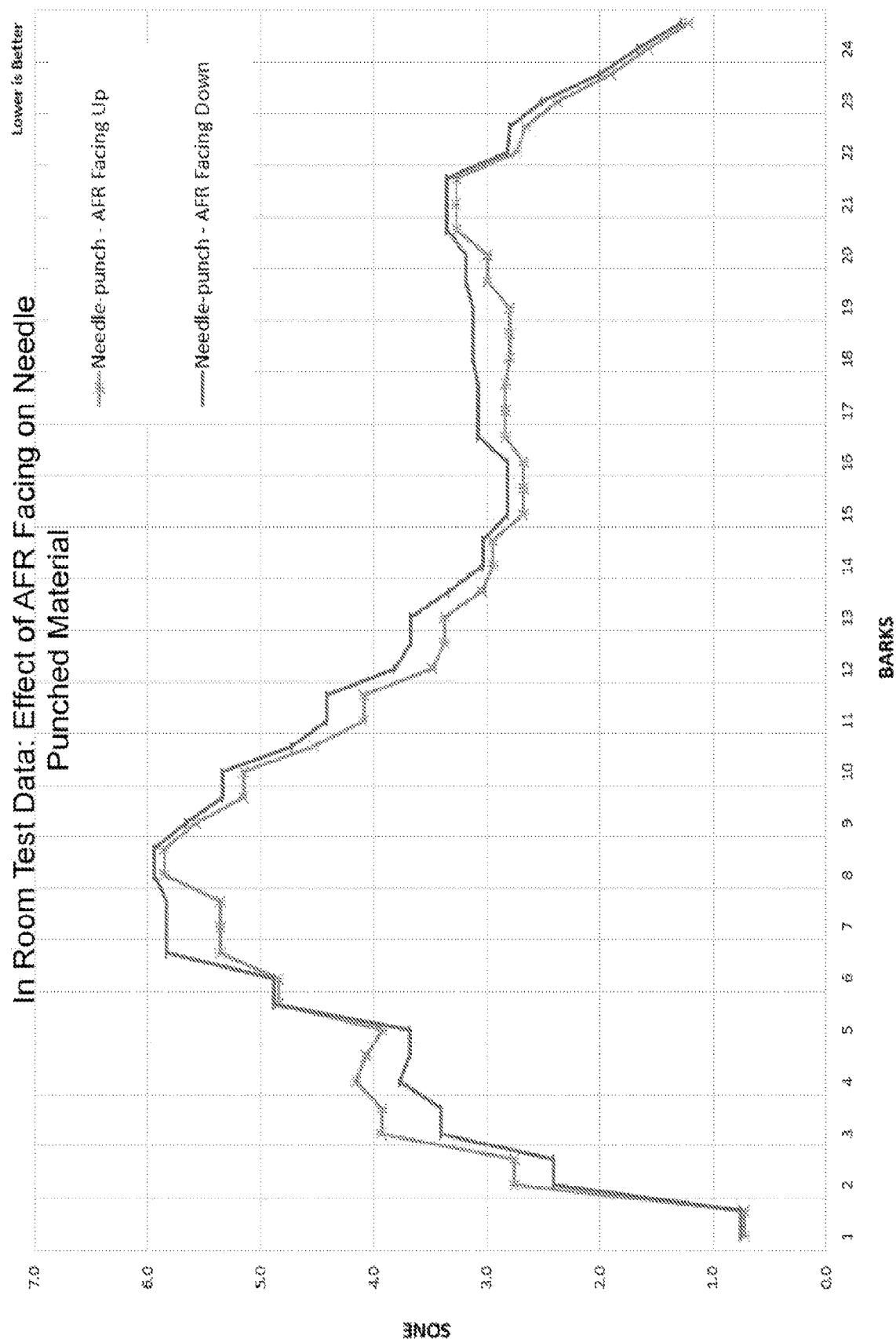

FIGS. 7A and 7B show comparison data between a needle punched layer having a facing layer facing upwards (i.e., toward the flooring layer), where the data points are denoted by an *, and a needle punched layer having the facing layer facing downward (i.e., toward the subfloor or cement), where the data points are denoted by a -. FIG. 7A shows results from testing below room, and FIG. 78 shows results from testing in-room. The results show the presence of a facing layer between the needle punched material and the flooring layer provides an improvement in in-room performance, where the facing layer is an AFR facing.

Figure 8A:
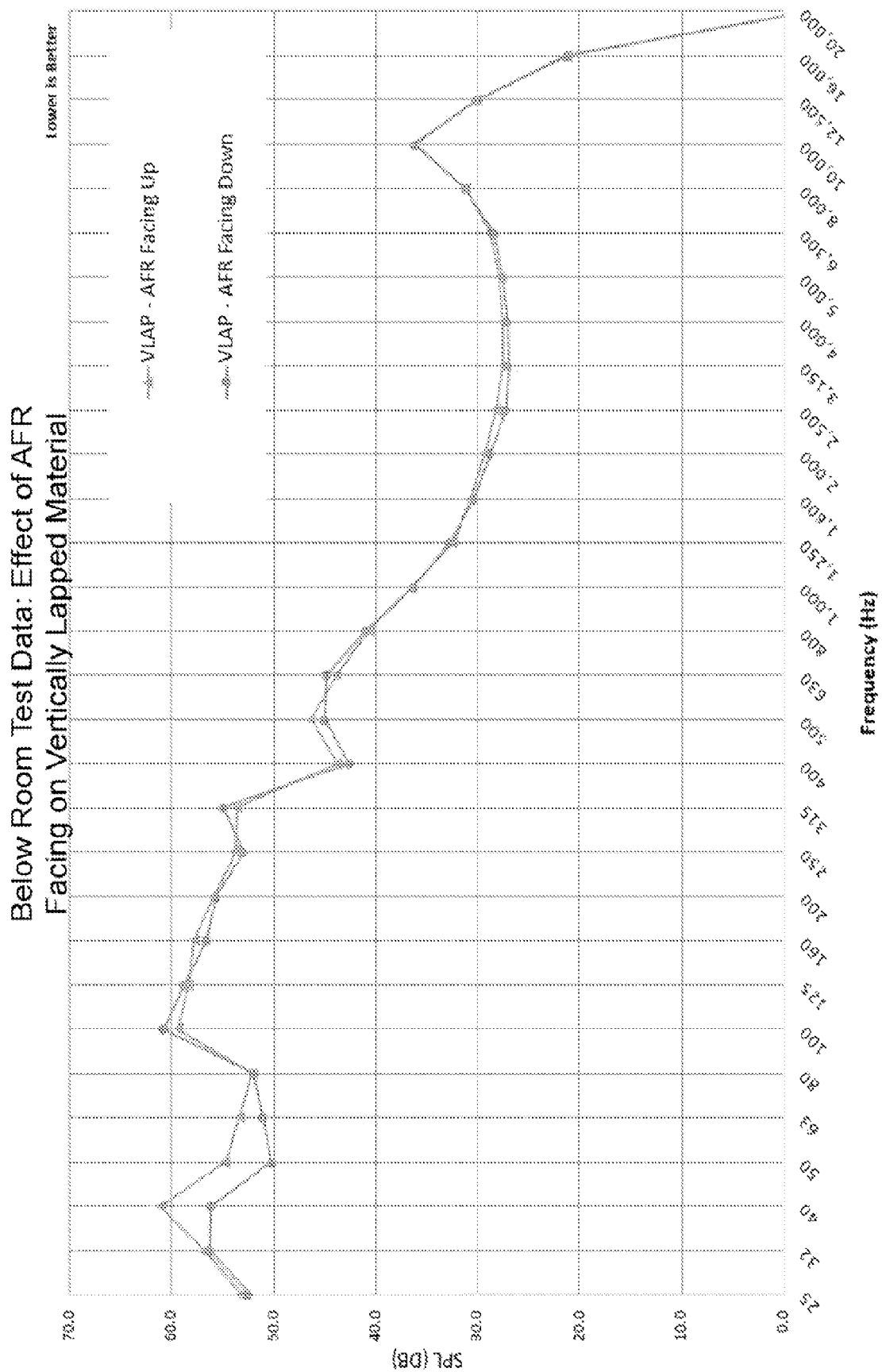
FIGS. 8A and 8B show performance data in below room testing and in room testing for the effect of an AFR facing on a vertically lapped material.
Figure 8B:
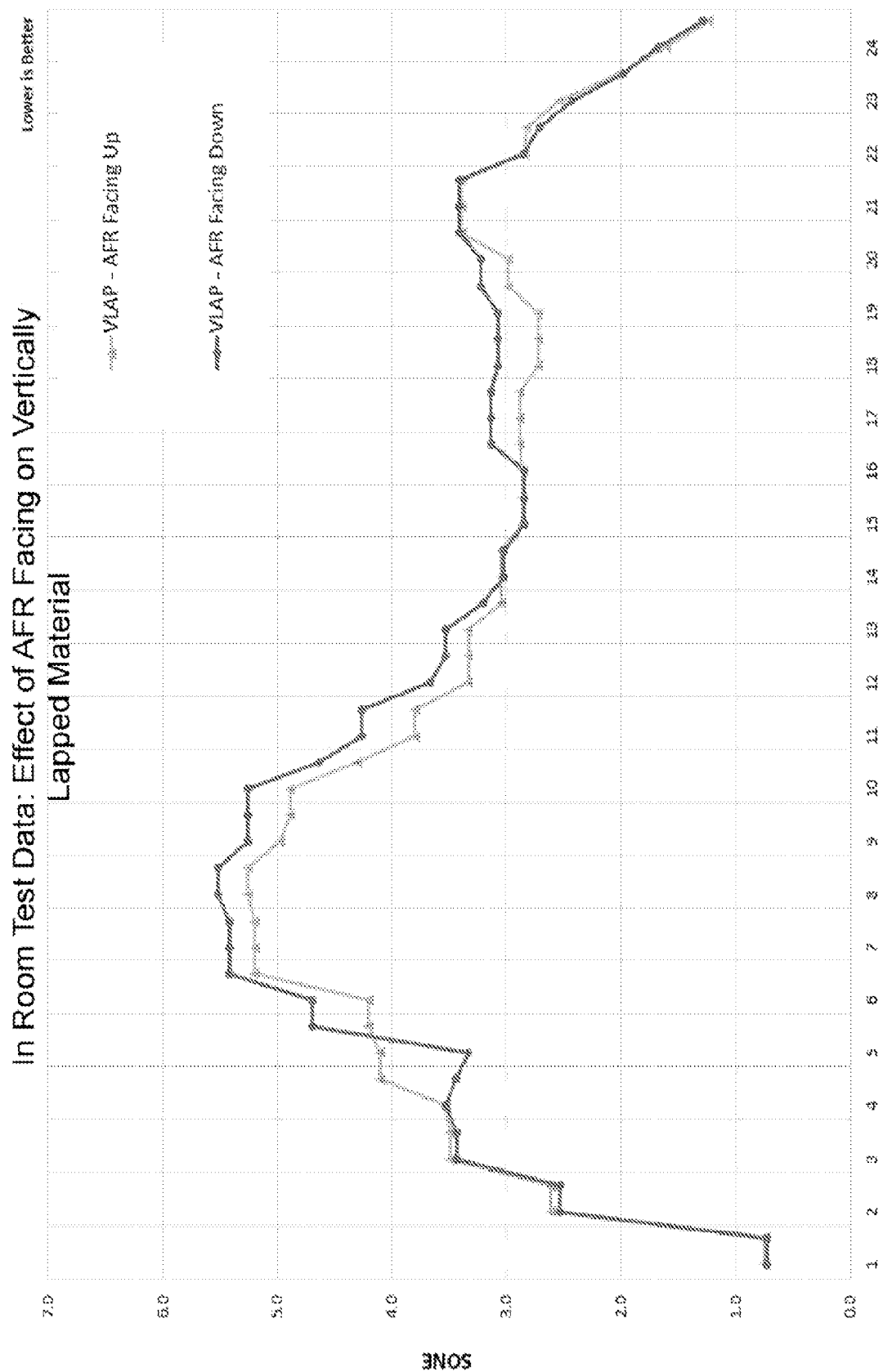

FIGS. 8A and 8B show comparison data between a vertically lapped layer having a facing layer facing upwards (i.e., toward the flooring layer), where the data points are denoted by a triangle, and a vertically lapped layer having the facing layer facing downward (i.e., toward the subfloor or cement), where the data points are denoted by a circle. FIG. 8A shows results from testing below room, and FIG. 8B shows results from testing in-room. The results show the presence of a facing layer between the vertically lapped material and the flooring layer provides an improvement in in-room performance, where the facing layer is an AFR facing.

The results therefore show the improved performance of the material with a facing layer. The results also show the improved performance of the vertically lapped material in comparison with other types of materials. There may be a synergistic and/or additive effect of combining both the vertically lapped material and the AFR facing layer. The acoustic performance may be improved by more than the sum of the acoustic performance of the layers individually.

A sample of a vertically lapped layer having a facing layer upwards (i.e., toward the flooring layer) is also tested against existing products—a commercially-available foam underlayment and a commercially-available recycled fiber-based underlayment. Tests are performed on an 18-inch Open Web Truss (OWT) subfloor and a 6-inch concrete slab subfloor, using 5.5 mm LVT/WPC type flooring. The impact sound transmission test is conducted in accordance with ASTM E492 test method. IIC and High-Frequency Impact Insulation Class (HIIC) values are calculated in accordance with ASTM E989 and ASTM E3222, respectively. These tests and calculations have been performed by a certified third-party lab.

Figure 9:
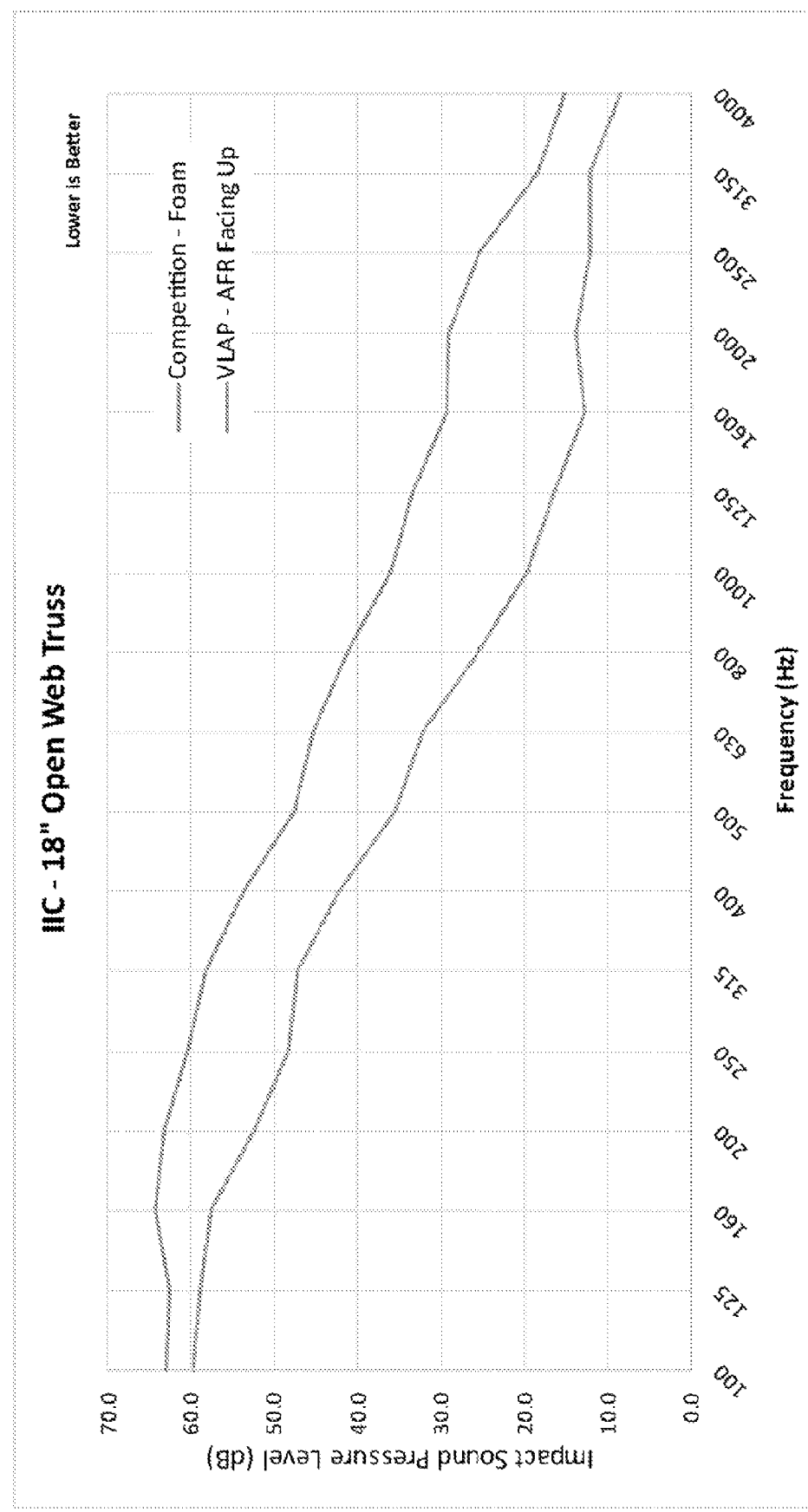
FIG. 9 is shows performance data of tested samples with an 18-inch open web truss subfloor.

FIG. 9 is a graph showing the results of the impact sound transmission test for the tested samples with the 18-inch open web truss subfloor. Results for the vertically lapped layer with a facing are shown as a solid line, and results for the commercially-available foam underlayment are shown as a dashed line. Table 1 below includes the calculated values for IIC and HIIC for the vertically lapped layer with a facing and the commercially-available foam underlayment. As is seen, the vertically lapped layer with a facing outperforms the commercially-available foam underlayment in both IIC and HIIC.

TABLE 1

| Sample | IIC | HIIC |
| --- | --- | --- |
| Vertically lapped with facing | 60 | 79 |
| Foam underlayment | 55 | 67 |

Figure 10:
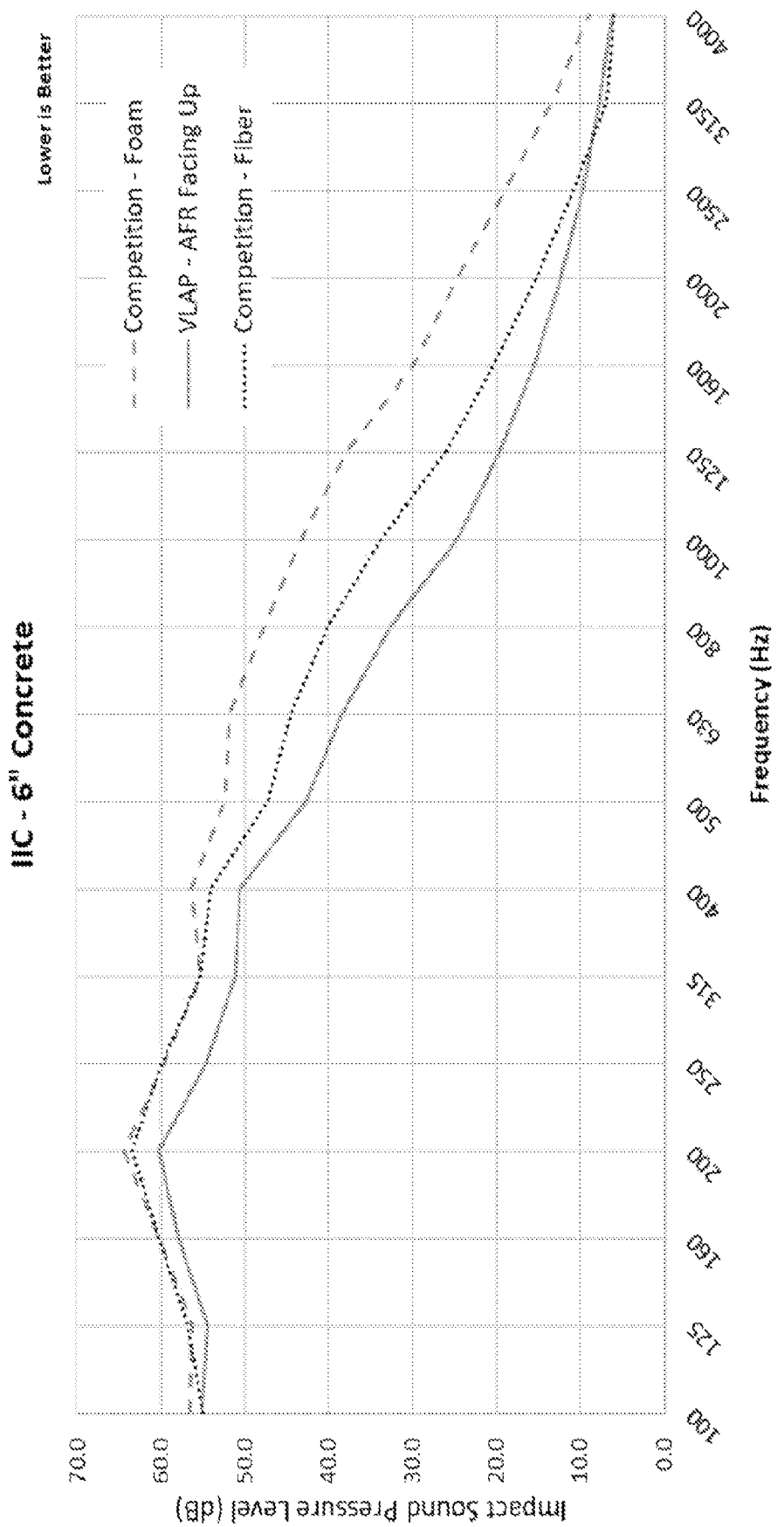
FIG. 10 shows performance data of tested samples with a 6-inch concrete slab subfloor.

FIG. 10 is a graph showing the results of the impact sound transmission test for tested samples with the 6-inch concrete subfloor. Results for the vertically lapped layer with a facing are shown as a solid line. Results for the commercially-available foam underlayment are shown as a dashed line. Results for the commercially-available recycled fiber-based underlayment are shown as a dotted line. Table 2 below includes the calculated values for IIC and HIIC for the vertically lapped layer with a facing, the commercially-available foam underlayment material, and the commercially-available recycled fiber underlayment material. As is seen, the vertically lapped layer with a facing outperforms the commercially-available foam underlayment and the commercially-available recycled fiber underlayment in both IIC and HIIC.

TABLE 2

| Sample | IIC | HIIC |
| --- | --- | --- |
| Vertically lapped with facing | 60 | 73 |
| Foam underlayment | 56 | 62 |
| Recycled fiber underlayment | 56 | 68 |

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A fibrous structure comprising:
   a. a vertically lapped layer having a first surface and a second surface, wherein the vertically lapped layer has a weight of about 110 gsm to about 175 gsm;
   b. a facing layer secured to the first surface of the vertically lapped layer, wherein the facing layer includes one or more of a spunbond (S) material, a spunbond and meltblown (SM) material spunbond+meltblown+spunbond (SMS) nonwoven material;
   c. a backing layer secured directly or indirectly to the second surface of the vertically lapped layer, wherein the backing layer comprises a spunbond PET material having a weight of about 8 gsm to about 22 gsm;
   wherein the fibrous structure has a thickness of about 5 mm or less; and
   wherein the fibrous structure is a flooring subassembly adapted to be used in a flooring assembly.

2. The fibrous structure of claim 1, wherein the facing layer is an air flow resistive facing layer.

3. The fibrous structure of claim 1, wherein the facing layer is a flooring contact layer adapted to contact a flooring surface, a subfloor, or both.

4. The fibrous structure of claim 1, wherein the facing layer comprises the SMS nonwoven material.

5. The fibrous structure of claim 4, wherein the SMS nonwoven material of the facing layer comprises a polypropylene SMS material.

6. The fibrous structure of claim 1, wherein the fibrous structure comprises a scrim or mesh.

7. The fibrous structure of claim 6, wherein the scrim or mesh is located between the second surface of the vertically lapped layer and the backing layer.

8. The fibrous structure of claim 6, wherein the scrim or mesh has a weight of about 20 gsm to about 30 gsm.

9. The fibrous structure of claim 1, wherein fibers of the vertically lapped layer are oriented generally vertically in an uncompressed state.

10. The fibrous structure of claim 1, wherein the vertically lapped layer is a compressed vertically lapped layer.

11. The fibrous structure of claim 1, wherein the facing layer has a weight of about 50 gsm to about 60 gsm.

12. The fibrous structure of claim 1, wherein the weight of the backing layer is about 10 gsm to about 20 gsm.

13. The fibrous structure of claim 1, wherein one or more of the layers includes an adhesive for bonding to an adjacent layer.

14. The fibrous structure of claim 1, wherein the fibrous structure has a thickness of about 1.5 mm or greater and about 3.5 mm or less.

15. The fibrous structure of claim 1, wherein the fibrous structure maintains its loft after a castor chair test at 25,000 cycles at 90 kg.

16. A fibrous structure comprising:
   a. a vertically lapped layer having a first surface and a second surface, wherein the vertically lapped layer comprises PET fibers and has a weight of about 110 gsm to about 175 gsm;
   b. a facing layer secured to the first surface of the vertically lapped layer, wherein the facing layer is formed of a polypropylene SMS material and has a weight of about 50 gsm to about 60 gsm;
   c. a backing layer comprising a spunbond PET material having a weight of about 10 gsm to about 20 gsm; and
   d. a scrim or a mesh sandwiched between the second surface of the vertically lapped layer and the backing layer, wherein the scrim or mesh has a weight of about 20 gsm to about 30 gsm;
   wherein one or more of the layers includes an adhesive secured thereto for binding to an adjacent layer; and
   wherein the fibrous structure is a flooring subassembly adapted to be used in a flooring assembly.

17. The fibrous structure of claim 16, wherein the fibrous structure includes one or more pressure sensitive adhesive layers for bonding a flooring surface to the fibrous structure, bonding the fibrous structure to a subfloor, or both.

18. A flooring assembly comprising a flooring surface and the fibrous structure of claim 1.

19. The flooring assembly of claim 18, wherein the flooring surface is vinyl, luxury vinyl tile, laminate, type, wood planks, linoleum, engineered wood, cork, hardwood, bamboo, stone, or a combination thereof.

20. The flooring assembly of claim 18, wherein the flooring assembly includes one or more pressure sensitive adhesive layers for bonding the flooring surface to the fibrous structure, bonding the fibrous structure to a subfloor, or both.

* * * * *